(12) United States Patent
Tillman

(10) Patent No.: US 8,293,821 B1
(45) Date of Patent: Oct. 23, 2012

(54) COMPOSITE WOOD ADHESIVE

(75) Inventor: Donald N. Tillman, Virginia Beach, VA (US)

(73) Assignee: Ply-Bond Chemicals & Mill Supplies, Inc., Virginia Beach, VA (US)

(*) Notice: Subject to any disclaimer, the term of this patent is extended or adjusted under 35 U.S.C. 154(b) by 395 days.

(21) Appl. No.: 12/456,373

(22) Filed: Jun. 16, 2009

Related U.S. Application Data

(63) Continuation-in-part of application No. 11/296,002, filed on Dec. 7, 2005, now abandoned.

(60) Provisional application No. 60/634,206, filed on Dec. 8, 2004.

(51) Int. Cl.
*C08L 3/00* (2006.01)
*C08L 89/00* (2006.01)

(52) U.S. Cl. .............. 524/47; 524/15; 524/16; 524/25; 264/533; 264/534

(58) Field of Classification Search .............. 524/17, 524/25, 47, 15, 16; 428/533, 534; 264/13
See application file for complete search history.

(56) References Cited

U.S. PATENT DOCUMENTS

| | | | |
|---|---|---|---|
| 3,775,144 A | 11/1973 | Ware et al. | |
| 3,775,145 A | 11/1973 | Ware et al. | |
| 3,793,113 A | 2/1974 | Pearson | |
| 3,907,728 A | 9/1975 | Lambuth et al. | |
| 4,070,314 A | 1/1978 | Alexander et al. | |
| 4,082,903 A | 4/1978 | Chow | |
| 4,105,606 A | 8/1978 | Forss et al. | |
| 4,200,723 A | 4/1980 | Chen | |
| 4,400,467 A | 8/1983 | Bauer et al. | |
| 4,568,714 A | 2/1986 | Overholt | |
| 4,801,631 A | 1/1989 | Sachs et al. | |
| 4,941,922 A | 7/1990 | Snyder | |
| 4,942,191 A * | 7/1990 | Rogers | 524/17 |
| 5,017,319 A | 5/1991 | Shen | |
| 5,202,403 A | 4/1993 | Doering | |
| 5,459,207 A | 10/1995 | Saigan et al. | |
| 5,556,906 A | 9/1996 | Collins et al. | |
| 5,609,711 A | 3/1997 | Miller | |
| 5,763,509 A | 6/1998 | Eastin et al. | |
| 5,895,545 A | 4/1999 | Miller | |
| 6,147,206 A | 11/2000 | Doner et al. | |
| 6,254,914 B1 | 7/2001 | Singh et al. | |
| 6,485,945 B1 | 11/2002 | Potter et al. | |
| 6,899,910 B2 | 5/2005 | Johnston et al. | |
| 6,962,722 B2 | 11/2005 | Dawley et al. | |
| 7,101,691 B2 | 9/2006 | Kinley et al. | |
| 2002/0065400 A1 | 5/2002 | Raskin et al. | |
| 2002/0132972 A1 | 9/2002 | Giroux et al. | |
| 2003/0216492 A1 | 11/2003 | Bowden et al. | |
| 2004/0249065 A1 | 12/2004 | Schilling et al. | |
| 2005/0101700 A1 | 5/2005 | Riebel | |
| 2005/0222358 A1 | 10/2005 | Wescott et al. | |
| 2005/0250900 A1 | 11/2005 | Stofko | |
| 2006/0147582 A1 | 7/2006 | Riebel | |
| 2007/0020476 A1 | 1/2007 | Kintzley et al. | |
| 2007/0036958 A1 | 2/2007 | Hagemann et al. | |
| 2007/0148339 A1 | 6/2007 | Wescott et al. | |

FOREIGN PATENT DOCUMENTS

| | | |
|---|---|---|
| BR | 7803385 | 12/1979 |
| JP | 52019732 | 2/1977 |
| JP | 56014571 | 2/1981 |
| WO | WO2008/035042 | 3/2008 |

OTHER PUBLICATIONS

Naidu, et. al., "Effects of Ground Corn Particle Size on Ethanol Yield and Thin Stillage Soluble Solids", Cereal Chemistry, vol. 84, No. 1, pp. 6-9, Jan.-Feb. 2007.
Wang, et. al., "Comparison of Raw Starch Hydrolizing Enzyme with Conventional Liquefaction and Saccarification Enzymes in Dry-Grind Corn Processing", Cereal Chemistry, vol. 84, No. 1, pp. 10-14, Jan.-Feb. 2007.
Selling, et. al., "Nonfood Utilization of Cereal and Soy Based Co-Products", USDOA, Agricultural Research Service, 2006 Annual Report, /www.ars.usda.gov/research/projects/projects.htm/.
"Coproducts and Near Coproducts of Fuel Ethanol Fermentation From Grain", Agriculture and Agri-Food Canada, /res2.agr.oa/publications/efar/chao2_e.htm/.
"S1007: The Science and Engineering for a Biobased Industry and Economy", SAES-422: S1007, Nov. 11, 2006/Jul. 2003, /nimiss.umd.edu/homepages/saes.cfm?trackID=1934/.
Donovan, John W. "Phase Transitions of the Starch-Water System", Biopolymers, vol. 18, 1979, pp. 263-275.

* cited by examiner

*Primary Examiner* — Ling Choi
*Assistant Examiner* — Gennadiy Mesh
(74) *Attorney, Agent, or Firm* — Williams Mullen

(57) ABSTRACT

An improved composite wood adhesive extender, a method of producing the extender, and an adhesive mixture including the extender are provided, wherein the extender has performance satisfactory to the manufacturing needs of composite and ply wood products, while also extending the adhesive at a reasonable cost. The adhesive mixture may comprise a primary and secondary extender. The primary extender is composed of a wood-based product. The secondary extender of the present invention is composed of an amylaceous material comprising 100% substantially uncooked flour or starch, or an amylaceous material comprising 100% substantially uncooked flour or starch blended with a high fiber by-product. Alternatively, the secondary extender is composed of pre-gelatinized flour or starch and a mixture of pre-gelatinized flour or starch with flour comprising an advantageous quantity of raw starch. The secondary extender may substitute for about 25-40% of the primary extender on about a 1:1 ratio basis.

4 Claims, 3 Drawing Sheets

COMPOSITE WOOD ADHESIVE

CROSS REFERENCE TO RELATED APPLICATIONS

This application is a continuation-in-part of and claims priority to U.S. patent application Ser. No. 11/296,002, filed Dec. 7, 2005, which claims priority from U.S. Provisional Application Ser. No. 60/634,206, filed Dec. 8, 2004. All of the above applications are herein incorporated by reference in their entirety as if fully set forth herein.

FIELD OF THE INVENTION

The invention relates generally to the bonding of cellulose materials. More particularly, the invention is directed to an extender of adhesives used in bonding cellulose materials, such as composite wood products.

BACKGROUND OF THE INVENTION

Composite woods products may be described as falling into five classes, each characterized by the treatment of the wood within the product: plywood, oriented strandboard, particleboard, hardboard, and fiberboard. For each class of composite wood, the configuration of the wood contributes to that product's physical properties and typical application. In addition, the adhesive, the density of the wood, and additives such as resin or fire retardants, may change the characteristics of the product.

Most composite woods are made using a thermosetting or heat curing adhesive to bind or hold the cellulose wood fibers together during the process of manufacturing. Commonly used composite wood adhesives or resin binders are formaldehyde, urea-formaldehyde, melamine-formaldehyde, and isocyanate. Phenol-formaldehyde resins are typically used for manufacturing products that require some degree of exterior exposure durability. Urea-formaldehyde resins are typically used in manufacturing products where dimensional uniformity and surface smoothness are of more concern than exterior durability (e.g., particleboard). Melamine-formaldehyde is an expensive resin used in decorative laminates or paper treatment. Isocyanates, such as di-phenylmethane di-isocyanate (or MDI) are also used in the manufacture of composite wood products. Natural adhesives, such as tannins, can be modified and reacted with formaldehyde to produce resins, as well. The curing characteristics of the resin, such as the cure temperature and time, are also additional factors in the choice of resin. Urea- and phenol formaldehyde resins are most widely used in manufacturing composite wood products.

These resins are expensive and may cause environmental and health problems. Oil shortages contribute to price increases. Formaldehyde is an irritant, a suspected carcinogen, and the resin base may release volatile organic compounds. (Toxicological Profile, ATSDR, DHHS-PHS 1999). In the composite wood industry, flour is often used as an extender for these expensive adhesives. Extenders reduce the cost of the resin and the concentration of any deleterious components. Extenders may contribute to prepress tack and have some adhesive action, but the resin solids are the ultimate moisture resistant binder.

Flour extenders known in the field include soy bean protein, casein, starch, oil cakes, corn flour, corn gluten protein, seed gums, and primarily wheat flour. In some cases, wheat and other flours or materials may be mixed. The combination of gluten or protein and starch in wheat flour appears to aid in the adhesiveness or tack of the final mixture, making it one of the most widely used extenders. Yet wheat flour, although cheaper than resin, is still relatively expensive compared to many other natural alternatives. Wheat flour is also somewhat unpredictable or variable. The proteins in wheat flour can cause stringing and lumping of the adhesive mixture, and accumulation or build up of glue on spray tips or other equipment, necessitating frequent cleaning. Thus, some have sought natural alternatives, such as fiber byproducts mixed with starch, but with limited commercial acceptance.

Accordingly, an object of the present invention is to provide an adhesive, adhesive extenders and mixture thereof for use in composite wood products satisfactory to the performance and manufacturing needs, as well as a method for the production and use of such an adhesive or adhesive extender in the manufacture of composite wood products.

It is an object of the present invention to accomplish the foregoing objective in a simple and cost effective manner.

Additional objects and advantages of embodiments of the invention will be set forth in part in the description which follows, and in part will be obvious from the description, or may be learned by practice of the invention. The objects and advantages of the invention will be obtained by means of instrumentalities in combinations particularly pointed out in the appended claims.

SUMMARY OF THE INVENTION

A substance is provided for the manufacture of composite wood products. As described above, adhesives used in manufacturing composite wood products may be extended by the use of soy bean, wheat, or corn flour. Most of this use has centered on wheat flour for its adhesiveness and ease of use, despite higher cost, stringing, and lumping. In the present invention, composite wood adhesive may be extended by a secondary extender, which may comprise either 1) a mixture of a first raw or native starch or flour at less than about 25% moisture, with about 5-60% of the high fiber by-product, which is 100% lightly cooked producing about 65-75% unaffected starch or flour, and about 25-35% partially or full cooked starch or flour, or 2) a mixture of about 65-75% of first starch or flour with about 25-35% of a low moisture pre-gelatinized starch or flour. In the present invention, an adhesive made with the secondary extender is disclosed which has demonstrated acceptable adhesiveness, viscosity, and cleaner performance. It has been also been surprisingly discovered that a secondary extender having the mixture of high fiber by-product mixed with the first raw or native starch or flour which is lightly cooked by co-extrusion, produces the same or better benefits of a secondary extender comprising about 65-75% of a first starch or flour with about 25-35% of pre-gelatinized starch or flour. The benefit of this discovery is that the secondary extender containing the high fiber by-product co-extruded and lightly cooked with the amylaceous material reduces expense and lessens the more extreme processing conditions needed to make the secondary extender comprising the pre-gelatinized starch or flour.

A method for manufacturing composite wood adhesive extenders is also provided, as well as an adhesive mixture. In one embodiment of the present invention, a method of manufacturing a composite wood adhesive is provided. The method includes the step of providing an amylaceous material comprising a first starch or first flour that is substantially uncooked and at less than about 25% moisture. The method also includes providing a high fiber by-product, and mixing the amylaceous material and the high fiber by-product. The method also includes co-extruding the high fiber by-product with the amylaceous material, such that the extruded mixture comprises about 5-60% of the high fiber by-product to form a secondary extender producing about 65-75% of unaffected raw native starch or flour, and about 25-35% partially or fully cooked flour or starch. The method further comprises providing about 60-80% of at least one resin, about 3-10% of a primary extender comprising walnut shell, pecan shell, alder bark, coconut shell or the fibrous dry substance remaining after furfural production, about 12-18% added water and about 1-5% of at least one caustic, and mixing the secondary extender, the at least one resin, the primary extender, the water and the at least one caustic to form the composite wood adhesive.

In yet another embodiment, method includes the step of providing a secondary extender which comprising an amylaceous material. The amylaceous material includes about 15-40% of a degraded pre-gelatinized first flour or starch and about 60-85% of a second flour or starch, wherein the first flour or starch is substantially free of raw starch and the second flour or starch is substantially uncooked, and wherein the first flour or starch and the second flour or starch comprise less than about 25% moisture. The method further comprises providing about 60-80% of at least one resin, about 3-10% of a primary extender comprising walnut shell, pecan shell, alder bark, coconut shell or the fibrous dry substance remaining after furfural production, about 12-18% added water and about 1-5% of at least one caustic, and mixing the secondary extender, the at least one resin, the primary extender, the water and the at least one caustic to form the composite wood adhesive.

DETAILED DESCRIPTION OF THE PREFERRED EMBODIMENTS

Figure 1:
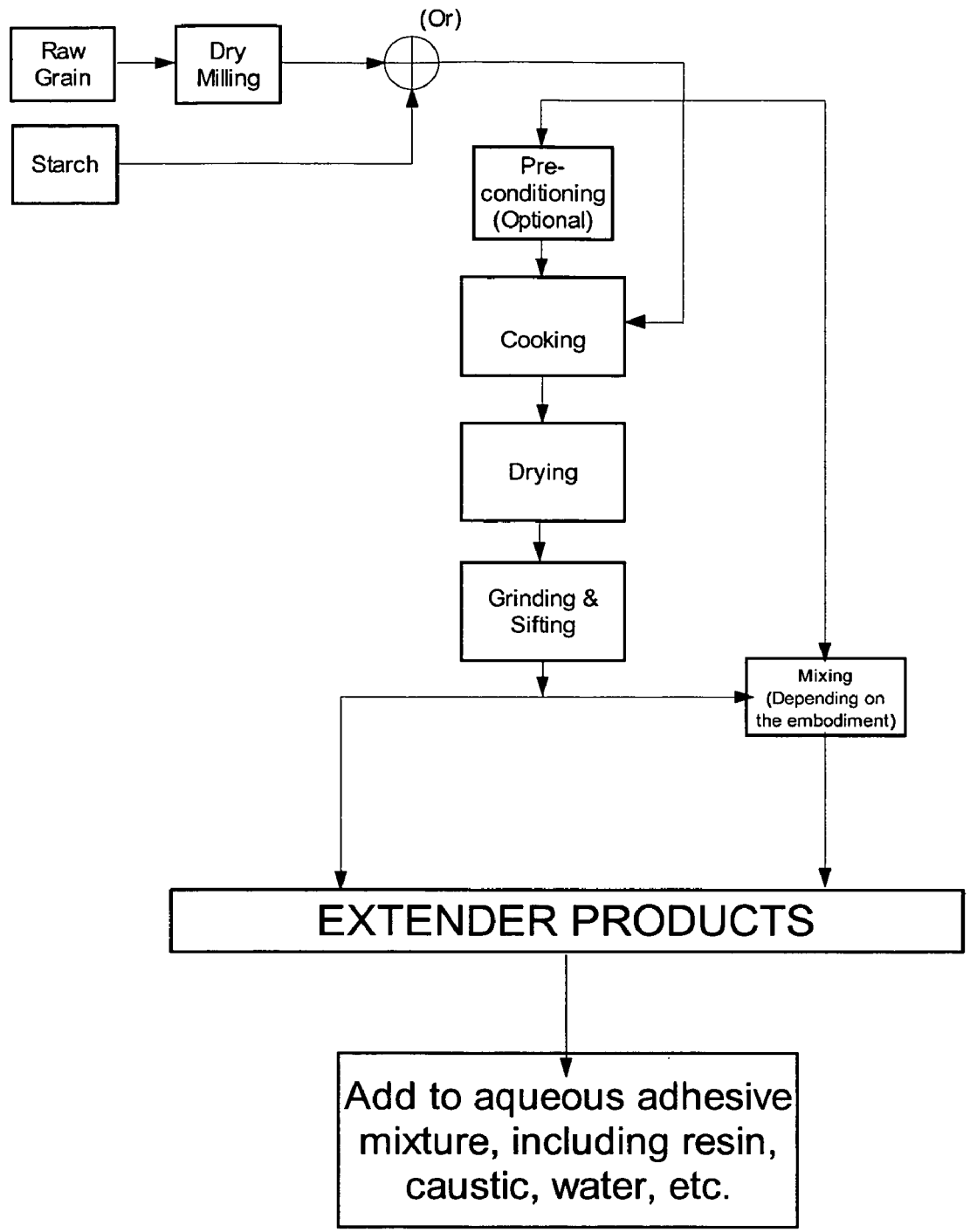
FIG. 1 is a block diagram of a process to produce a composite wood adhesive extender.

The manufacturing of wood composite products varies considerably, depending on the type of product and the configuration desired. The manufacture of plywood may be considered illustrative for an embodiment of the present invention. Plywood refers to wood panels glued together under pressure. Typically, the grain within the wood panels is altered to enhance the strength and dimensional stability of the panels. The grain of the faces or outer plies is typically oriented longitudinally. Plywood often incorporates a core or inner ply of veneer, lumber, or particle board, such that the number of layers is commonly odd. The grain of the core plies runs parallel to the face plies. The adherence of the plies within a panel plays a large role in the successful performance of the panel. In order to test the sufficiency of the adhesive at the interface between the panels, it is typical to measure the wood failure at the bonded joints. Wood failure is measured by the area of wood fiber remaining at the glue line following completion of a specified shear test. In the present invention, the adhesive may produce a composite wood having a wood failure of at least 75%, or more specifically, at least 80%.

To manufacture plywood, sheets of veneer are cut into the desired dimensions, and dried to an acceptable moisture content, if necessary. An adhesive mixture may then be applied to the veneer plies by spray, roller, foaming, curtain coating, hand, etc. Spray application is commonly used to achieve consistent and thorough application. The veneer plies are then mechanically or manually placed together in a "lay up" step, which orients the grain of the different plies. Assembled panels then enter a cold pre-press to establish contact between the adhesive and the veneer plies, and to level or flatten the plies. The panels are then transferred to a hot press for thermosetting of the resin within the adhesive mixture.

The adhesive mixture and panels are preferably to be of an appropriate moisture content; too much moisture may lead to the formation of steam during the hot press step, which can bubble or escape, damaging the panel. Excessive moisture can also interfere with the resin cure times. The adhesive mixture is preferably sufficiently tacky after the cold pre-press step in order to prevent separation of the plies prior to the panel reaching the hot press step; however, the adhesive mixture should not be so viscous as to create manufacturing problems during application. Further, the adhesive mixture must be sufficiently liquid so as to enable even application or spraying and to promote bonding with the wood, but not so thin as to introduce too much moisture, to flow off the panel, or to over penetrate.

As noted previously, flours are used as conventional extenders within wood adhesive mixtures. Flour is a finely ground meal produced by milling the seeds or fruit of various cereals or other plants. Common types of flour are wheat, corn, rice, oat, soybean, buckwheat, barley, rye, triticale, etc. Milling typically, but not necessarily, involves removing the bran and germ portions of the kernel or grain from the starchy endosperm. The combination of gluten protein and starch in wheat flour appears to aid in the adhesiveness or tack of the final mixture, while the viscosity of wheat flour is appropriate for the manufacturing process. However, the protein in wheat may contribute to cleanliness problems, as discussed above. Standard corn flour has also been used to replace some portion of wheat flour; however, standard corn flour by itself lacks sufficient adhesiveness for acceptable performance in the step between the cold pre-press and the hot press.

Introduction

One aspect of the present invention is an adhesive for use in composite wood products. The adhesive may comprise of a combination of a resin, water, caustic, a primary extender and a secondary extender. The resin of the present invention may be present in the amount of about 60-80% and may comprise any resin known in the art, including but not limited to, phenyl-formaldehyde resin, urea-formaldehyde resin, melamine-formaldehyde resin and resol, such as a phenolic resol. The content of the resin solids in the adhesive mixture may comprise about 25-35%, more specifically 28-32% solids content.

The added water of the present invention may be present in the amount of about 12-18%, which does not include the water present in other compounds in the adhesive mixture, such as the water present in the resin. The caustic may be present in the amount of about 1-5%, or more specifically, about 2-4%. The caustic may comprise caustic soda (NaOH), calcium hydroxide or any compound chemically similar to caustic soda, such as caustic alcohol ($C_2H_5ONa$). The caustic of the present invention may comprise about 50% solids. Optionally, the adhesive may comprise about 0-1% soda ash.

Primary and secondary extenders are also disclosed and may be included in the adhesive of the present invention. Extenders may be included to reduce the costs of the adhesive and add particulate matter to the mixture. The adhesive may include a primary extender in the amount of about 3-10%, or more specifically, about 4-10%. Alternatively, the primary extender may comprise about 3-6%, since the secondary extender may substitute for about 25-40% of the primary extender at about a 1:1 ratio basis. The primary extender may include various cellulosic or wood based products, including but not limited to, walnut shells, pecan shells, alder bark, and coconut shells, as well as fibrous substances remaining after furfural production.

One exemplary aspect of the present invention is a secondary extender for use in the adhesive mixture, which may be present in an amount of about 5-15%. The secondary extender typically comprises amylaceous materials, such as cereal flours, starches or fractions thereof. The secondary extender may comprise either 1) a mixture of a first raw or native starch or flour at less than about 25% moisture, with about 5-60% of the high fiber by-product, which is lightly cooked producing about 65-75% unaffected starch or flour, and about 25-35% partially or full cooked starch or flour, or 2) a mixture of about 15-40% of a degraded pre-gelatinized first flour or starch that is substantially free of raw starch and about 60-85% of a second flour or starch that is substantially uncooked. The amylaceous material of the present invention preferably comprise less than about 25% moisture, preferably less than about 17% moisture, and most preferably comprising 10-12% moisture, which when combined to produce an adhesive of the present invention, may produce a finished adhesive product having about 10-12% moisture.

The high fiber by-product of the secondary extender is typically derived from cereal materials having less than about 50% starch, and may be present in the amount of about 5-60% of the secondary extender. The high fiber by-product may comprise soybean hull, corn hull, wheat hull, oat hull, sorghum hull, cotton seed hull, malt husks, extracted corn germ, rice hull, rice bran, spent distillers grain, spent brewers grain, spent solids from cellulosic fermentation or mixtures thereof. The solids content of the high fiber by-product may comprise about 16-40%, more specifically, may comprise about 16-25% solids content, and most specifically, may comprise about 16-20% solids content.

The high fiber by-product of the present invention provides fiber and protein, wherein the fiber acts as a low viscosity substitute for the primary extender with good tack from the dissolved fiber fragments. The protein may be present in an amount of about 0.5-5% of the adhesive, which is an amount sufficient to offset the resin, but not so much to cause viscosity and pot life problems. It is an object of this invention that co-extrusion of the high fiber by-product with the amylaceous material denatures the protein in the high fiber by-product but leaves the fiber portion of the high fiber by-product basically unaltered. Although it is believed that the fiber portion of the high fiber by-product is unaltered by the co-extrusion process, it is also believed that the hemicellulose in the fiber portion is affected in that the hemicellulose is dissolved by the high pH of the plywood resin mixture, which may be about 10 or more, to produce small fiber fragments that have viscosity properties that are similar to the viscosity properties of the primary extender. It is further believed that the formation of the small fragments of fiber caused by the high pH of the mixture allow the fiber to better react with the resin in the claimed invention, thereby forming a better mechanical lock and may participate with chemical bonding to form moisture resistant bonds, as the adhesive mixture cures in the presence of heat and pressure, as shown in U.S. Pat. Nos. 6,518,387 and 7,416,598, which are incorporated herein by reference in their entireties. For purposes of this invention, moisture resistant adhesives are adhesives capable of bonding composite wood in a manner to have a panel average of 80% wood failure or greater when tested in accordance with a boiling test. The boiling test includes boiling test specimens in water for 4 hours, which are then dried for 20 hours at a temperature of 63±3° C. with sufficient air circulation to lower moisture content of the specimens to a maximum of 8%. The specimens are boiled again for a period of 4 hours, cooled in water, and tested while wet by tension loading to failure in a shear testing machine operated at a maximum head travel of 406 mm (16 inches) per minute. Jaws of the machine securely grip the specimens so there is no slippage. The percentage of wood failure is then determined with specimens in a dry condition and evaluated.

Denaturing of the protein and certain of the high fiber by-products, including soy protein, during co-extrusion causes the protein to form long linear chains that reduces the number of reactive sites on the protein molecule, which delays the reaction of the protein with the resin in the plywood adhesive mixture. This also has the benefit of reducing the viscosity growth over time and allows for a shorter pot life associated with the use of protein in the adhesive mixture.

It is also believed that the protein from the amylaceous material in the secondary extender shrink as they are denatured during the co-extrusion process. Most of the protein in the amylaceous material may comprise storage proteins, such as prolamins which may, in the case of corn, comprise primarily zein. It is believed that the shrinkage of the protein allows the material to be more inert, and act more as a filler, with regard to the resin, itself and any other carbohydrates present in the mixture. This inert property has the benefit of reducing or eliminating any plugging or other build-up problems associated with other proteins, such as wheat protein. It is believed that it also helps to eliminate viscosity stability and pot life problems associated with an excess of protein. The unique mixture of proportions discovered allows the secondary extender to substitute for a portion of the primary extender and the resin, which reduces costs associated with the adhesive mixture. In one embodiment, this essentially allows for the secondary extender to substitute for a portion of the primary extender. For example, in one embodiment, the secondary extender may substitute for about 25-40% of the primary extender on a 1:1 ratio basis, while exhibiting the same beneficial qualities as if no substitution had occurred. This is beneficial since prices in the industry may fluctuate for the primary extender or secondary extender materials, which would allow the product to be made the most cost effectively and exhibit the same or better qualities.

In an alternative embodiment, the secondary extender may comprise an amylaceous material comprising of a mixture of about 15-40% of a degraded pre-gelatinized first flour or starch that is substantially free of raw starch and about 60-85% of a second flour or starch that is substantially uncooked. The treated flour or starch is commonly termed "pre-gelatinized" or "pre-gel." Pre-gelatinized flour is flour that has been further treated, cooked, and/or mechanically worked so that it readily hydrates at relatively lower temperatures to form a stable paste. A pre-gelatinized starch is simply the pre-gelatinization of the amylaceous component of flour. Gelatinization typically can require about 40% moisture or more; at this moisture level, the starch granules begin to swell with added water and burst, dispersing the starch molecules. If the moisture content is reduced, there can be insufficient water for full or 100% gelatinization, but if there is sufficient temperature, the particles can be melted producing a mixture of melted and gelatinized particles.

The pre-gelatinization aspect of the present invention may be one of a variety of low moisture processes, as described in greater detail below. A raw flour and pre-gelatinized flour mixture used as an adhesive extender has been shown to provide acceptable adhesiveness and appropriate viscosity within an adhesive mixture, while also providing a low cost performance that is cleaner or less lumping than wheat flour. Those skilled in the field will recognize that the present invention should be construed as extending to grains with similar performance for their use in the present invention. Corn flour and similar grains are preferable for some embodiments in that it is of consistent quality and their protein components are water insoluble and do not form fibrous materials during processing or use. As discussed previously, corn protein is a globular protein that becomes more compact during working, such as extrusion. In addition, starches having high gelatinization temperatures, such as rice starch, may reduce the efficiency of the process.

Pre-gelatinized flours have historically been rejected for use as extenders because of the additional processing steps, workability, and perception of increased cost. However, the process described herein produces a secondary extender at a competitive cost and effective performance, while reducing the expense to the end users of cleaning caused by the stringing, lumping, and buildup of conventional flour extenders.

Producing Embodiments of the Secondary Extender

Figure 2:
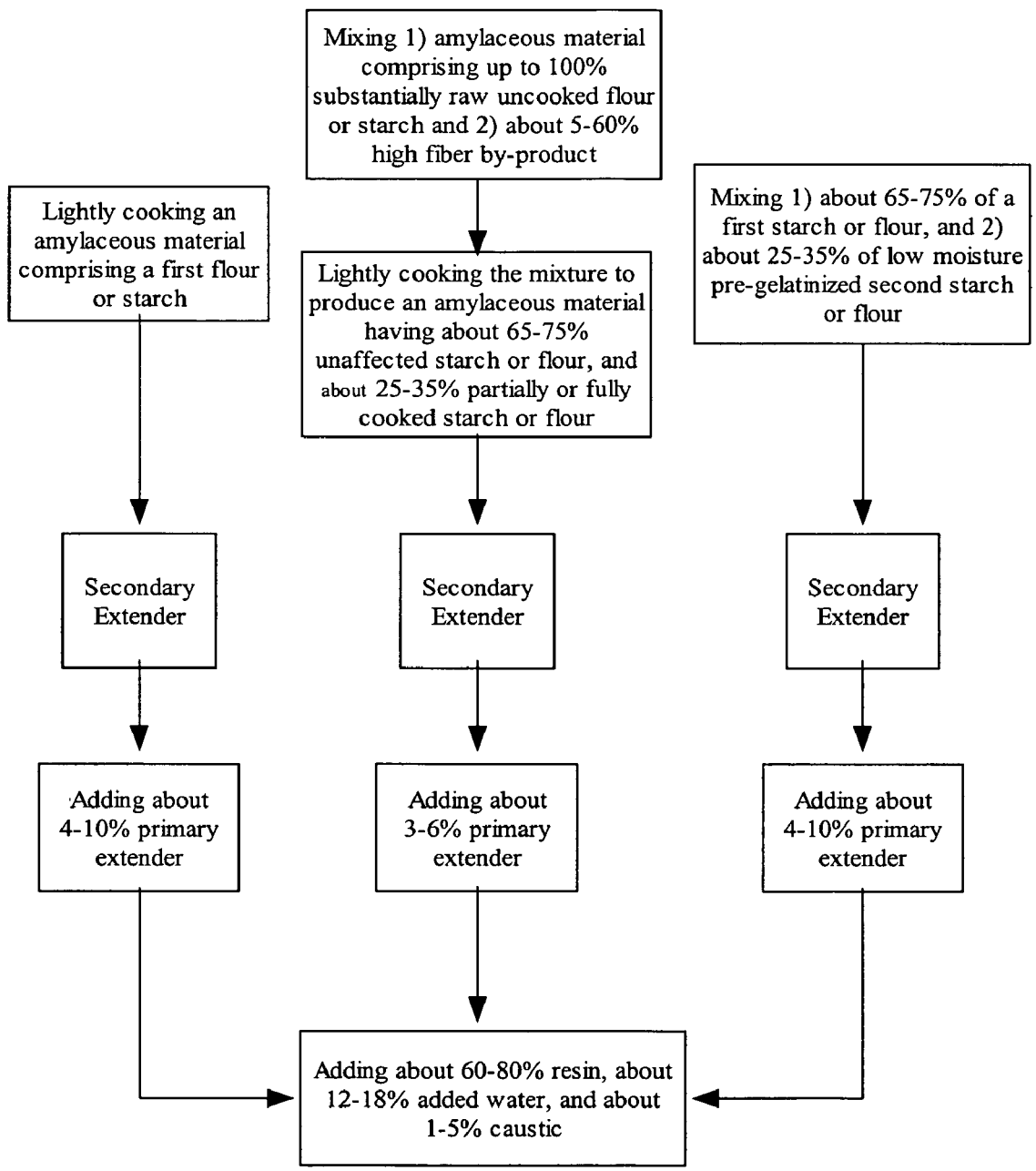
FIG. 2 is a block diagram of a process to produce a composite wood adhesive.

An example of a process to produce an embodiment of the secondary extender is shown in the flow chart of FIG. 1. An alternative process to produce an adhesive comprising the secondary extender is shown in FIG. 2. The secondary extender may comprise 1) a mixture of amylaceous material of up to 100% substantially raw uncooked flour or starch with a high fiber by-product, or alternatively, may comprise 2) a mixture of raw uncooked flour or starch, and pre-gelatinized flour or starch.

As shown in FIG. 2, the process for producing the secondary amylaceous material comprising a mixture of amylaceous material of up to 100% substantially raw uncooked flour or starch with a high fiber by-product begins with mixing the amylaceous material and the high fiber-by product. The amylaceous material comprises about 40-95% and the high fiber by-product comprises about 5-60% of the secondary extender. The high fiber by-product may include soybean hull, corn hull, wheat hull, oat hull, sorghum hull, cotton seed hull, malt husks, extracted corn germ, rice hull, rice bran, spent distillers grain, spent brewers grain, spent solids from cellulosic fermentation or mixtures thereof. The high fiber by-products may comprise about 12-17% protein, and comprise a mixture of fine and coarse particles. It is also believed that the amount of protein in the high fiber by-product helps to bond free formaldehyde in the adhesive mixture. The high fiber by-product of the present invention may be ground to obtain a desired particle size to increase the bulk density to reduce transport cost and to help the initial blending before further processing with the amylaceous material in the secondary extender.

The high fiber by-product and amylaceous material may be stored in bins for future production. The high fiber by-product and amylaceous material may be metered out of their respective storage bins with variable frequency drives (VFDs) to give the proper ratio of materials during production. The high fiber by-product and amylaceous material may be dropped through airlocks into separate pneumatic dilute phase air convey transport systems. Both streams may be passed through a turbilizer under controlled conditions to blend the product before it passes to a surge bin ahead of the cooking process. Optionally, the product may be blended for about 15 minutes and sent to storage. The blend of high fiber by-product and amylaceous material may be stored for a short time in a hopper ahead of the cooking device, such as an Anderson Expander-Extruder-Cooker made by Anderson International Corp., Cleveland, Ohio.

The mixture may be lightly cooked in a grain expander at about 150-250° F. with the pressure of the die at about 50-300 PSI, which produces a composition having about 65-75% unaffected starch or flour, and about 25-35% partially or full cooked starch or flour. The blend may optionally be pre-conditioned in a mixing chamber with water to raise the moisture in a uniform manor. Then the flour or starch may be treated or worked at elevated temperatures and pressures, followed by extrusion through a die.

It is believed that the controlled "light cooking" of the amylaceous material and high fiber by-product impacts the viscosity characteristics of the finished product. The cook of the product may be controlled by observing the consistency with a Bostwick consistometer, which is a device used for measuring the consistency and/or flowability of various materials.

In one embodiment, the high fiber by-product comprises soy hull. Soy hulls are a by-product of soy flour production. The process of soy hull production begins by roasting the soybeans to inactivate certain harmful enzymes, such as urease. Then the soybeans are cooled and cracked producing hulls, grits, and flour. During the roasting process, pieces of the hull or outer seed coat detaches and are aspirated by passing air through the cracked material. This entrains the lighter hull pieces in the air stream, lifting them away from the denser soy grits, which may be ground to a fine powder or extracted to obtain soybean oil.

Without being bound to any particular theory, it is also believed that extruding the amylaceous material and the high fiber by-product produces unexpected benefits with regards to production of the product. For example, co-extruding the products reduces wear on processing equipment. The high fiber by-product of the present invention typically has embedded nodules, such as silicon nodules, which cause wear on equipment during subsequent grinding of the product. Accordingly, extruding the amylaceous material and the high fiber by-product together reduces wear by enrobing the nodules with the amylaceous material. It has also been found that extrusion of the amylaceous material and the high fiber by-product eliminates any separation issues with the product, which increases the efficiency of the subsequent handling and grinding.

The process for producing the secondary amylaceous material comprising a mixture of raw uncooked flour or starch, and pre-gelatinized flour or starch begins with the amylaceous material, such as starch or raw flour, which is dry milled. The size of dry milled flour is commonly between 20-100 U.S. mesh. The size may vary depending on the mixture of the final product, as discussed further below. Typically, dry milled flours will have low moisture, such as 10-12%, and preserve the endosperm intact. High moisture flours may be unstable during processing. Preferably, the fat content of the flour is low (e.g., less than about 3%) to avoid the potential of saponification.

Starches may be from a wide variety of sources, such as corn, sorghum, cassaya, soy, potato, barley, oats, or wheat. Flours for pre-gelatinization may be corn, sorghum, cassaya, soy, or wheat. Raw flours added to pre-gelatinized material may be corn, cassaya, sorghum, or similar flours having water insoluble proteins, avoiding the water soluble and fibrous proteins found in flours such as wheat or barley. Corn flour has shown good performance and predictable, consistent quality.

The pre-gelatinization step may include one of a number of low moisture methods. As noted above, pre-gelatinization is generally a treatment of flour or starch to mechanically degrade, cook, or melt the starch and produce a product that will hydrate faster and build viscosity more quickly and at generally lower temperatures. The starch or flour may optionally be preconditioned in a mixing chamber with warm water and steam (150-200° F.) to begin a preliminary cooking process. Then the flour or starch may be treated or worked at elevated temperature by extruding through a die. For example, extrusion may be undertaken at temperatures ranging from 200-400° F. with a die pressures 50-2000 PSI and screw speed from 100-600 RPM. Good results for corn flour were achieved with extrusion at 250-350° F., 200-1200 PSI die pressure, and 200-300 RPM. For that embodiment, water was added at the input of the extruder so that the moisture of the flour was typically under about 25%, preferably about 16-25%. Different extruders will accommodate different characteristics, so other temperatures, pressures, screw speeds, moisture content, and screw configurations may be appropriate.

The extruder cooks the amylaceous material and changes its molecular structure by friction and shear, which degrades the starch polymer components. The amylaceous material and high fiber by-product are mechanically pressed through the die, which is a small orifice, by the extruder's internal screw. As the output of the extruder exits an end orifice, the material expands or puffs in a fashion similar to popcorn. For this embodiment, the output should be substantially fully cooked, with little or no raw starch. This pre-gelatinized material is then dried and transferred to a grinding and sifting process to create a fine powder that when hydrated has superior binding characteristics. The pre-gelatinized flour or starch is ground on the order of −100 mesh. Such grinding preferably renders the material labile to caustic.

Moisture content for the pre-gelatinized material is typically below 13%, and preferably below 11%. Ambient or cold water viscosity, with no raw starch remaining, falls within a range of 100-600 centipoises, with 300-400 centipoises being typical. As starch gelatinization temperatures are reached in the extruder, there will be a melting and gelling of the starch into a homogeneous mass, while protein is typically denatured. The output may be sampled to determine the level of starch cooking by using a Rapid Visco Analyzer (RVA). Other approaches may be used to determine the extent of starch cook, such as differential scanning calorimetry may be used to determine the extent of starch cook.

Figure 3:
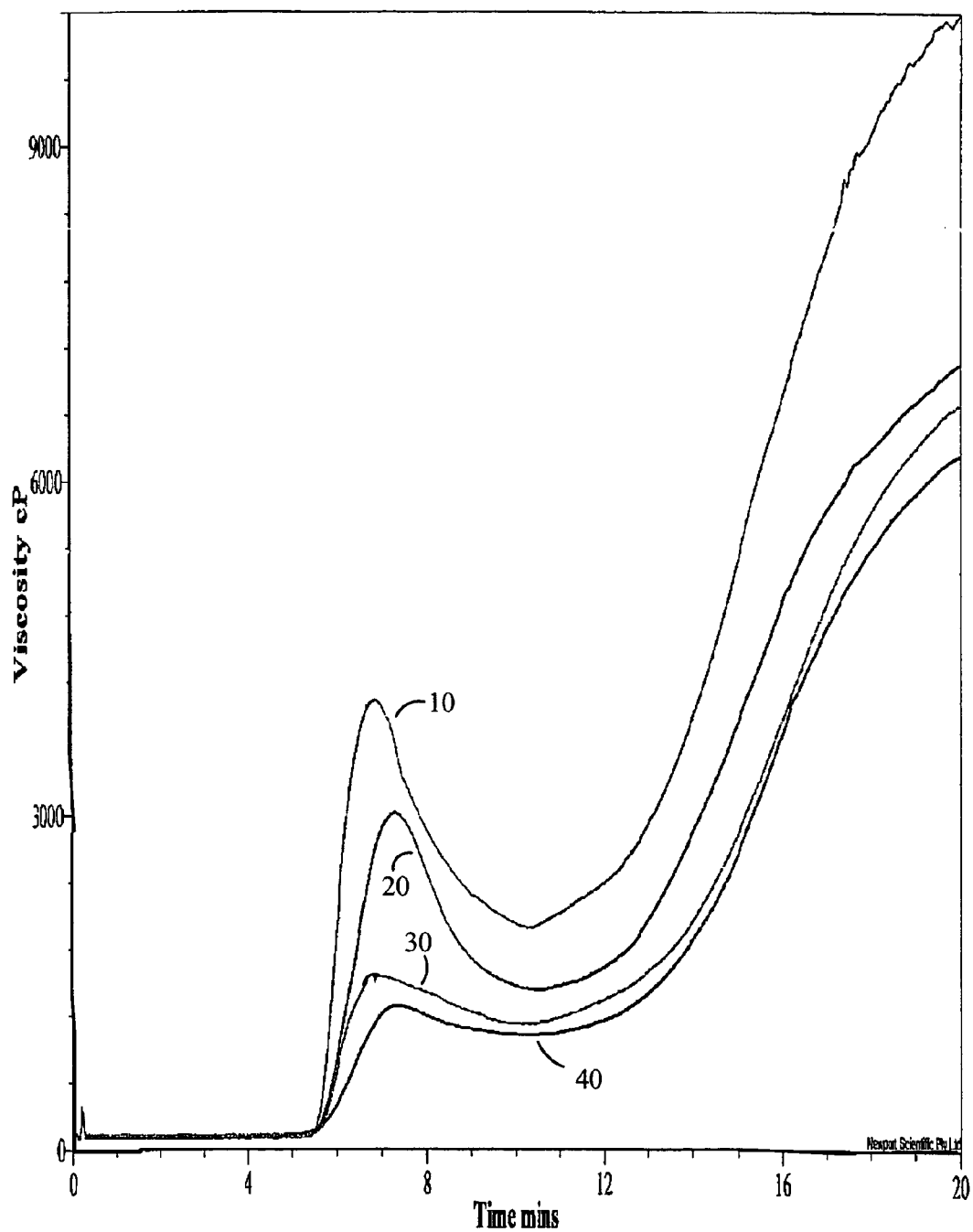
FIG. 3 is a plot of the Rapid Visco Analyzer results for four materials.

FIG. 3 is an RVA plot showing the viscosity of various materials using a common pre-gel protocol. This protocol involved mixing a material with water and heating it from 25° C. to 90° C. at about the five minute point, maintaining 90° C. for about ten minutes to cause gelatinization, then dropping the temperature to 20° C. and adding more water. Line 10 for raw corn flour exhibits the highest profile with a significant starch gelatinization peak, which is followed by a thinning minimum and then a setback increase. Line 20 shows the behavior of a conventional extender of a mixture of 65% raw corn flour and 35% wheat flour.

Extruded or cooked starch will produce a lower RVA viscosity profile than raw starch. As noted above, preferably for this embodiment, the amylaceous material and high fiber by-product are substantially cooked or melted, leaving little or no raw starch. Accordingly, a material having no raw starch would show a low viscosity profile and would lack a gelatinization peak. From a manufacturing perspective, this renders the entire batch useful. The ground pre-gel powder should generally have a film forming capacity, and forms a relatively sticky substance with significant tack. An adhesion or "sticky" test on a range of 1 to 10 using 20 grams of pre-gel mixed into 35 ml of water will demonstrate film forming capacity at 6; preferably, the pre-gel powder will measure about 8 or above.

Those skilled in the field will readily see that other low-moisture methods of treating a starch or flour for pre-gelatinization may be used. For example, an expander/extruder (single or multiple screw) may be used to heat the amylaceous material or high fiber by-product while under pressure, whether as a batch or a continuous process. Alternatively, a low moisture dry roasting process may be used, possibly in combination with the addition of acid to produce dextrin, which may then be mixed with flour. Other approaches may include puffing, heat treating with a turbilizer mixer, high shear paddle mixer, or a plow mixer in order to degrade the starch. In general, a dry or low moisture process is preferable because a wet or high moisture process will require drying to remove the added moisture.

Optionally, an additional processing step may include mixing untreated starch or flour with the pre-gelatinized amylaceous material and/or high fiber by-product. As noted above, flours similar to corn flour may be used for this purpose and include cassaya, sorghum, or other flour having water insoluble proteins, avoiding the water soluble and fibrous proteins found in flours such as wheat or barley. Of course, starches lack protein; starches may include corn, sorghum, cassaya, soy, potato, barley, oats, or wheat. The raw starch or flour is ground to a fineness grade appropriate for the adhesive spray nozzles or other mechanism and appropriate for proper hydration of the extender. The preferable range of overall extender grind is −100 to +300 mesh.

The ratio of the mixture of corn flour to pre-gelatinized flour or starch in the amylaceous material is preferably adapted to the manufacturing process and the needs of the composite wood product. In the illustrative example of extenders for plywood adhesive mixtures, viscosity, tack, and moisture content are important factors. The balance or ratio of flour to pre-gelatinized starch or flour affects the adhesiveness and viscosity. For example, for embodiments of the invention employed with plywood manufacturing, a secondary extender mixture having 15-40% pre-gelatinized corn flour mixed with standard corn flour provided sufficient adhesiveness or tack in the step between cold pre-press and hot press, along with acceptable levels of viscosity. Line 30 in FIG. 3 illustrates the viscosity for a mixture of 65% corn flour and 35% pre-gelatinized corn flour. A Vacuum Pressure Test on southern pine plywood made with an adhesive mixture extended with 65% corn flour and 35% pre-gelatinized corn flour showed a 2% increase in wood failure (i.e., a decrease in adhesive failure) over an adhesive extended with a blend of wheat flour and corn flour.

An alternative embodiment of the amylaceous material of the secondary extender involves a starch or flour (i.e., corn flour or similar, such as cassaya, sorghum, or soy) passed through the treatment for pre-gelatinization, but with an output having 15-40% cooked starch and 85-60% raw starch. For this embodiment, no flour need be added after the pre-gelatinization treatment. For example, corn flour may be treated within an extruder with an output of pre-gelatinized corn flour from the extruder having 15-40% cooked starch. Line 40 in FIG. 3 illustrates the viscosity for an extender of this embodiment having about 65% raw starch and 35% cooked starch. The output is then ground on the order of −100 mesh. Of course, the final viscosity, tack, and moisture content of the extender should be appropriate for the contemplated application.

Extending Wood Adhesive Mixtures

The adhesive of the present invention may be processed as known in the art. In one embodiment, the resin may be added at different steps of processing the adhesive. However, additional of a portion of the resin at the beginning of the process may lower the viscosity as compared to a process of adding the resin at a later step. It is believed that addition of a portion of the resin at the beginning of the process stabilizes the high fiber by-product, which ultimately leads to an adhesive product having a lower viscosity. For example, the adhesive may be processed by combining the water at about 100-130° F. and about 30-40% of the total resin in a mixer and blended for about three minutes. The secondary extender may be subsequently added to the blend.

Next, the primary extender may be added to the blend followed by about a five to ten minute mix time. Caustic may be subsequently added to the blend and mixed for about fifteen minutes, which may increase the blend to a pH of about 8-12. Optionally, soda ash may be blended into the mixture after the caustic. Finally, the remaining about 60-70% of the total resin may be added to the blend to complete the adhesive mixture. While it is believed that the foregoing steps of addition of the various ingredients comprise one method of addition, one skilled in the art may modify the steps of addition depending on desired characteristics of the finished adhesive product. Additionally, one of ordinary skill in the art may modify the process to add all ingredients without timed holds.

The adhesive mixture may be blended for a total time of about one to two hours. The foregoing components of the adhesive mixture may be heated to a desired temperature to aid in the dispersion or digestion of the components into the mixture. Optionally, digestion of the materials may be increased using timed holds, which are intermediate durations of time in between mix times in which the mixer ceases mixing to allow the ingredients to better disperse or digest to form the adhesive mixture. Until the adhesive is used, it may be stored and placed in a recycle system to control the viscosity. For example, the finished adhesive product may optionally have a viscosity of 800 to 2,000 centipoises at a temperature of about 20-35° C. With the use of a low shear stirred tank with a recycle, the adhesive of the present invention may maintain a viscosity of 1,500 to 3,000 centipoises after 72 hours holding time at about 20-35° C. Alternatively, the adhesive may be processed in high shear systems.

As noted above, the adhesive mixed with the extenders may be sprayed onto composite wood or wood plies, so the extenders should be adapted to the apparatus of a pressurized sprayer; an adhesive mixture of too high viscosity may impede mixture flow or damage equipment. When the wood plies exit the cold press, the adhesive mixture should be able to retain adhesion among the various plies in the panel. The extender may contribute a portion of the bonding force between plies, but the adhesive resin is the primary source of bonding force. Thus, the present invention involves preparation of an embodiment of the extender and mixing the extender with the adhesive; thus, the extender is intended to be incorporated into a manufacturing process for composite wood products, such as plywood, with only minor changes familiar to those of ordinary skill in the field.

The adhesive mixture of the present invention is preferably water resistant. While the resin in the claimed invention is typically inherently water resistant, the addition of the remaining ingredients does not substantially diminish the water-resistance properties of the resin and produces a finished adhesive product which is also water resistant.

Each application or use of the present invention will introduce factors that are peculiar to that manufacturing process. Spinning disk resin applicators used in the manufacture of particle composites may require a viscosity different from that required for the manufacture of plywood. Further, the composite wood product, and its intended use, will introduce additional performance requirements. For example, particle board may require a higher concentration of resin to bind the smaller wood pieces into the finished product. Nevertheless, the present invention contemplates the requirements of adhesiveness and viscosity to be among the primary determining factors for most manufacturing processes. Other materials may be added to adapt to variations in manufacture process or product use.

The total quantity of the primary and secondary extenders added to a resin mixture will depend primarily on the minimum amount of resin solids required for effective bonding. The mixture may vary by type of wood (softwood or hardwood), wood product application, method of manufacture, and manufacturer. The mixture for southern pine plywood adhesive may comprise about 42-44% dry solids and about 56-58% added water. Of the dry solids content, a typical weight percent of extenders may be about 11.8-14.5%, with resin solids comprising about 27-32%, and caustic soda (e.g., NaOH) about 2.7-3.2%. In contrast, hardwood plywood mixtures may have a solids weight percent of 56.6% extender.

The actual resin mixing process will depend on a wide variety of factors known to those skilled in the art. Some of these factors include the composite wood product, ambient conditions, the resin mixture constituents, mixture ratios, moisture content, required viscosity, intended resin delivery mechanism, etc. In general, flour based extenders should be wetted prior to addition of caustic. The mixing process may be adjusted in order of steps, timing, quantities, temperature, etc. by those skilled in the art to adapt the process to the particular needs of the intended application.

In practice, an adhesive mixture extended by the corn flour and pre-gelatinized corn flour embodiment rendered the overall adhesive mixture much cleaner than adhesive mixtures extended by wheat flour and corn flour blends. The quantity of glue build up and stringing of adhesive was significantly reduced. In one day of operating a plywood manufacturing facility, daily cleaning time of the spray booth area was reduced by about 50%.

The following specific examples are set forth to more fully describe but are not intended to limit the scope of the invention. Adhesive mixtures were made according to the following specifications, exhibiting consistent quality with respect to viscosity and granulation and passed plywood manufacturing facility quality standards.

EXAMPLE 1

|  | Weight Percent |
|---|---|
| Resin | 74.42 |
| Water | 11.64 |
| Caustic | 3.00 |
| Primary Extender | 4.16 |
| Secondary extender | 6.23 |
| Soda Ash | 0.56 |

EXAMPLE 2

|  | Weight Percent |
|---|---|
| Resin | 65 |
| Water | 17.2 |
| Caustic | 3 |
| Primary Extender | 6 |

-continued

EXAMPLE 2

|  | Weight Percent |
| --- | --- |
| Secondary extender | 9 |
| Soda Ash | 0.56 |

EXAMPLE 3

|  | Weight Percent |
| --- | --- |
| Resin | 65 |
| Water | 17.2 |
| Caustic | 3 |
| Primary Extender | 4.7 |
| Secondary extender | 9.73 |
| Soda Ash | 0.5 |

EXAMPLE 4

|  | Weight Percent |
| --- | --- |
| Resin | 65 |
| Water | 18 |
| Caustic | 3 |
| Primary Extender | 5.3 |
| Secondary extender | 8.7 |

EXAMPLE 5

|  | Weight Percent |
| --- | --- |
| Resin | 65 |
| Water | 18 |
| Caustic | 3 |
| Primary Extender | 4.4 |
| Secondary extender | 9.6 |

EXAMPLE 6

|  | Weight Percent |
| --- | --- |
| Resin | 74.4 |
| Water | 11.7 |
| Caustic | 3 |
| Primary Extender | 4.6 |
| Secondary extender | 6.2 |

While the description above refers to particular embodiments of the present invention, it will be understood that many modifications may be made without departing from the spirit thereof. For example, at the time of invention, corn flour was less expensive than wheat flour; relative prices may also change among suitable flours. The present invention expressly includes a wide variety of starches and other flours, such as sorghum, cassaya, or others that exhibit similar characteristics to that of corn and could provide inexpensive alternatives to high demand products for that particular agricultural season. The above description is intended to cover such modifications as would fall within the true scope and spirit of the present invention.

What is claimed is:

1. A method of manufacturing a composite wood adhesive comprising:
    providing an amylaceous material consisting essentially of starch or flour that is uncooked comprising less than about 25% moisture;
    providing about 5-60% of a high fiber by-product;
    mixing the amylaceous material and the high fiber by-product;
    co-extruding the high fiber by-product with the amylaceous material at a temperature of about 150 F to about 400 F, at a die pressure of about 50 PSI to about 2000 PSI, and at a rate of about 100 RPM to about 600 RPM, such that the amylaceous material comprises about 25-35% of fully or partially pre-gelatinized starch or flour and about 65-75% of substantially uncooked starch or flour to form a secondary extender;
    providing about 60-80% of at least one resin, about 3-10% of a primary extender comprising walnut shell, pecan shell, alder bark, coconut shell or the fibrous dry substance remaining after furfural production, about 12-18% added water and about 1-5% of at least one caustic; and
    mixing the secondary extender, the at least one resin, the primary extender, the water and the at least one caustic to form the composite wood adhesive.

2. The method of claim 1, wherein the amylaceous material comprises corn flour and the high fiber by-product comprises soy hull.

3. The method of claim 1, wherein the high fiber by-product is chosen from the group consisting of soybean hull, corn hull, wheat hull, oat hull, sorghum hull, cotton seed hull, malt husks, extracted corn germ, rice hull, rice bran, spent distillers grain, spent brewers grain, spent solids from cellulosic fermentation or mixtures thereof.

4. The method of claim 1, wherein the resin is phenol-formaldehyde.

* * * * *